(12) United States Patent
Katsuragi

(10) Patent No.: US 8,531,778 B2
(45) Date of Patent: Sep. 10, 2013

(54) ZOOM LENS AND PHOTOGRAPHING APPARATUS INCLUDING THE SAME

(75) Inventor: Daigo Katsuragi, Yokohama (JP)

(73) Assignee: Samsung Techwin Co., Ltd., Changwon (KR)

( * ) Notice: Subject to any disclaimer, the term of this patent is extended or adjusted under 35 U.S.C. 154(b) by 277 days.

(21) Appl. No.: 12/977,917

(22) Filed: Dec. 23, 2010

(65) Prior Publication Data

US 2011/0157720 A1  Jun. 30, 2011

(30) Foreign Application Priority Data

Dec. 25, 2009 (JP) .................................. 2009-296050
Apr. 7, 2010 (KR) .......................... 10-2010-0031879

(51) Int. Cl.
*G02B 15/14* (2006.01)

(52) U.S. Cl.
USPC .......................................................... 359/694

(58) Field of Classification Search
USPC .......................................................... 359/694
See application file for complete search history.

(56) References Cited

U.S. PATENT DOCUMENTS

2004/0042087 A1* 3/2004 Takato ........................... 359/694

* cited by examiner

*Primary Examiner* — James Jones
(74) *Attorney, Agent, or Firm* — Sughrue Mion, PLLC

(57) ABSTRACT

A small-sized zoom lens having a high zooming rate and a high optical performance, the zoom lens including a first lens group having a positive refractive power, a second lens group having a negative refractive power, a third lens group having a positive refractive power, and a fourth lens group having a positive refractive power, wherein an iris diaphragm is disposed between the second lens group and the third lens group.

21 Claims, 25 Drawing Sheets

ZOOM LENS AND PHOTOGRAPHING APPARATUS INCLUDING THE SAME

CROSS-REFERENCE TO RELATED PATENT APPLICATIONS

This application claims priority from Korean Patent Application No. 10-2010-0031879, filed on Apr. 7, 2010, in the Korean Intellectual Property Office, and Japanese Patent Application No. 2009-296050, filed on Dec. 25, 2009, in the Japan Patent Office, the disclosures of which are incorporated herein in their entireties by reference.

BACKGROUND

1. Field

Apparatuses consistent with exemplary embodiments relate to a zoom lens and a photographing apparatus including the same.

2. Description of the Related Art

Photographing apparatuses, such as surveillance cameras including a solid state imaging device, such as a charge coupled device (CCD) or a complementary metal-oxide semiconductor (CMOS), video cameras, digital cameras, or the like are widely used. Photographing apparatuses need to have a high performance and be small-sized. Thus, zoom lenses used in photographing apparatuses also need to have a high optical performance and be small-sized.

As an example of zoom lenses used in photographing apparatuses, a rear focusing zoom lens including a first lens group having a negative refractive power and including a negative lens and a positive lens and having at least one aspherical surface, a second lens group having a positive refractive power, a third lens group having a positive refractive power, and a fourth lens having a positive refractive power, wherein the first lens group, the second lens group, the third lens group, and the fourth lens group are sequentially arranged from an object side to an image side, and wherein, simultaneously, zooming is performed by moving the second lens group in an optical axis direction, a variation in an image plane caused by zooming is corrected by moving the fourth lens group in the optical axis direction, and focusing is performed, is widely used.

In the rear focusing zoom lens, an effective diameter of the first lens group may be made relatively small compared to that of a zoom lens that performs focusing by allowing the first lens group to move in the optical axis direction, and thus the entire lens system may be easily minimized. Also, since close focusing can be performed and a comparatively small and light-weight lens group is moved in the optical axis direction, the rear focusing zoom lens can quickly focus on a subject by using only a small amount of driving power.

As the sizes of pixels are greatly reduced due to a solid state imaging device having a small size and a large number of pixels, a small-sized zoom lens having high optical performance and a short overall length of a lens is required. However, in order to obtain high optical performance, the number of lenses needs to be increased, and the overall length of the lens needs to be increased. Thus, it is difficult to make a small-sized zoom lens.

Also, in order to make a small-sized zoom lens while increasing a zooming rate of the zoom lens, a variation in aberration caused by zooming increases, and thus it is difficult to obtain good optical performance from a wide angle end to a telephoto end. In particular, in a zoom lens having a high zooming rate, it is difficult to correct spherical aberration at the telephoto end. Also, as the size of the zoom lens becomes small and a zooming rate thereof increases, the amount of aberration of an actuating lens group increases.

SUMMARY

One or more of the exemplary embodiments provides a small-sized zoom lens with a high optical performance and a photographing apparatus including the zoom lens.

According to an aspect, there is provided a zoom lens comprising a first lens group having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged from an object side to an image side, zooming is performed by moving the second lens group in an optical axis direction and focusing is performed by moving the fourth lens group in the optical axis direction, and the zoom lens satisfies the following Equations: $1.4 < |f_2|/f_W < 2.0$, $0.3 < f_1/f_T < 0.6$, where a combined focal length of the first lens group is $f_1$, a combined focal length of the second lens group is $f_2$, a focal length of the zoom lens at a wide angle end is $f_W$, and a focal length of the zoom lens at a telephoto end is $f_T$.

An iris diaphragm is disposed between the second lens group and the third lens group.

The first lens group comprises a negative lens and three positive lenses sequentially arranged from the object side.

The three positive lenses comprise two positive lenses each having a convex surface on the object side.

The second lens group comprises at least three negative lenses and a positive lens sequentially arranged from the object side.

The third lens group comprises a positive lens having a convex surface on the object side and a negative meniscus lens having a concave surface on the image side.

When a lens surface of the object side of the meniscus lens has a curvature radius of R3W and a lens surface of the image side of the meniscus lens has a curvature radius of R3T, the zoom lens satisfies the following Equation: $1.5 < R3W/R3T < 3.0$.

When a length of an optical axis from a vertex of the object side of the lens disposed closest to the object side of the first lens group to an image plane is $\Sigma D$, the zoom lens satisfies the following Equation: $0.6 < (\Sigma D/f_T) < 1.3$.

When an Abbe's number of a positive lens disposed closest to the object side of the first lens group is v1D, the zoom lens satisfies the following Equation: $80 < v1D$.

The fourth lens group comprises a positive lens having at least one aspherical surface and two convex surfaces and a negative meniscus lens having a concave surface on the object side.

When a focal length of the third lens group is $f_3$, the zoom lens satisfies the following Equation: $4.0 < f_3/f_W < 6.0$.

When lateral magnification during focusing on an object at infinity e at the telephoto end is β4T, the fourth lens group satisfies the following Equation: $0.3 < β4T < 0.6$.

The first lens group comprises a negative lens, a positive lens, and two positive lenses each having a convex surface on the object side, wherein the lenses are sequentially arranged from the object side to the image side, and the second lens group comprises at least three negative lenses and a positive lens, wherein the lenses are sequentially arranged from the object side to the image side, and the third lens group comprises a positive lens having a convex surface on the object side and a negative meniscus lens having a concave surface on the image side, wherein the lenses are sequentially arranged from the object side to the image side.

According to another aspect, there is provided a photographing apparatus comprising a zoom lens; and an imaging device for photoelectrically converting an image formed by the zoom lens, wherein the zoom lens comprises a first lens group having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged from an object side to an image side, zooming is performed by moving the second lens group in an optical axis direction and focusing is performed by moving the fourth lens group in the optical axis direction, and the zoom lens satisfies the following Equations: $1.4 < |f_2|/f_W < 2.0$, $0.3 < f_1/f_T < 0.6$, where a combined focal length of the first lens group is $f_1$, a combined focal length of the second lens group is $f_2$, a focal length of the zoom lens at a wide angle end is $f_W$, and a focal length of the zoom lens at a telephoto end is $f_T$.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings.

Lens data illustrated in the following description is only an example, and the present invention is not limited thereto and may be properly modified within the scope of the invention.

Figure 1:
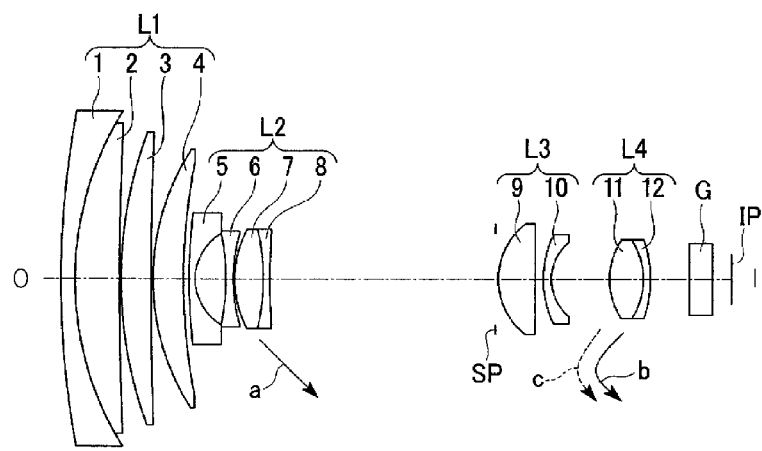
FIG. 1 is a cross-sectional view of a zoom lens according to an exemplary embodiment.

FIG. 1 is a cross-sectional view of a zoom lens according to an exemplary embodiment.

The zoom lens according to the current exemplary embodiment may be used as a photographing optical system of a photographing apparatus, such as a surveillance camera, a digital video camera, a digital still camera, or the like. The zoom lens includes a first lens group L1 having a positive refractive power, a second lens group L2 having a negative refractive power, a third lens group L3 having a positive refractive power, and a fourth lens group L4 having a positive refractive power. The lens groups L1, L2, L3, and L4 are sequentially arranged from an object side O to an image side I of the zoom lens, as illustrated in FIG. 1. An iris diaphragm SP may be disposed between the second lens group L2 and the third lens group L3, and an optical block G that corresponds to an optical filter, a faceplate, or the like may be disposed between the fourth lens group L4 and an image plane IP.

In the zoom lens, while the first and third lens groups L1 and L3, respectively, are fixed, zooming is performed by moving the second lens group L2 in an optical axis direction, and focusing is performed by moving the fourth lens group L4 in the optical axis direction. Also, in the zoom lens, when zooming is performed from a wide angle end to a telephoto end, the second lens group L2 is moved to the image side I according to an arrow a of FIG. 1, and simultaneously, the fourth lens group L4 may be moved according to an arrow b or c of FIG. 1. The arrows b and c each is convex toward the object side O, thereby correcting a variation in the image plane IP caused by zooming.

The arrow b indicated by a solid line and the arrow c indicated by a dotted line in FIG. 1 represent moving paths for correcting a variation in the image plane IP caused by zooming when an object at infinity and a near object are respectively focused on. The fourth lens group L4 is moved according to a moving path that is convex toward the object side O, thereby efficiently using a space between the third lens group L3 and the fourth lens group L4 and reducing the overall length of the zoom lens.

The photographing apparatus forms an image at a photographing plane of an imaging device (photoelectric conversion device), such as a charge coupled device (CCD), a complementary metal-oxide semiconductor device, or the like, that is, light incident on the object side O of the zoom lens is transmitted onto the image plane IP. The photographing apparatus photoelectrically converts light formed as an image on the imaging device into an electrical signal and generates a digital image corresponding to an image of a subject. Then, the photographing apparatus writes the digital image into a recording medium, such as a hard disk drive (HDD), a memory card, an optical disc, a magnetic tape, or the like. When the photographing apparatus is a film camera, the image plane IP corresponds to a film plane.

The first lens group L1 may include a negative lens 1, a positive lens 2, and two positive lenses 3 and 4 each having a convex surface on the object side O. The lenses 1, 2, 3, and 4 are sequentially arranged from the object side O to the image side I. Thus, light affected by a positive refractive power of the first lens group L1 is dispersed into each of the lenses 2, 3, and 4, thereby easily correcting spherical aberration at the telephoto end.

The second lens group L2 may include at least three negative lenses 5, 6, and 7 and a positive lens 8 sequentially arranged from the object side O to the image side I. Thus, distortion aberration of a wide angle may be prevented, and a variation in spherical aberration caused by zooming may be corrected.

The third lens group L3 may include a positive lens 9 having a convex surface on the object side O and a negative meniscus lens 10 having a concave surface on the image side I. The lenses 9 and 10 are sequentially arranged from the object side O to the image side I. Thus, a position of a main point of the third lens group L3 is moved to the object side O, and a distance between the third lens group L3 and the fourth lens group L4 is reduced, thereby miniaturizing the zoom lens.

The fourth lens group L4 may include a positive lens 11 that has at least one aspheric surface and two convex surfaces, and a negative meniscus lens 12 that has a concave surface formed on the object side O. The lenses 11 and 12 are sequentially arranged from the object side O to the image side I. Thus, a variation in aberration during focusing may be reduced.

In the zoom lens according to an exemplary embodiment, when a combined focal length of the first lens group L1 is $f_1$ [mm], a combined focal length of the second lens group L2 is $f_2$ [mm], a focal length of the zoom lens at the wide angle end is $f_W$ [mm], and a focal length of the zoom lens at the telephoto end is $f_T$ [mm], the zoom lens may satisfy the following Equations 1 and 2:

$$1.4 < |f_2|/f_W < 2.0 \qquad (1)$$

$$0.3 < f_1/f_T < 0.6$$

When $|f_2|/f_W$ is less than the lower limit value of Equation 1, a variation in aberration from the wide angle end to the telephoto end during zooming may not be easily corrected. On the other hand, when $|f_2|/f_W$ is greater than the upper limit value of Equation 1, the amount of movement from the wide angle end to the telephoto end during zooming increases, and thus, the overall length of the zoom lens increases. Also, when $f_1/f_T$ is less than the lower limit value of Equation 2, spherical aberration at the telephoto end may not be properly corrected. On the other hand, when $f_1/f_T$ is greater than the upper limit value of Equation 2, the focal length of the first lens group L1 increases, and allowance for miniaturization decreases, and thus, the overall length of the zoom lens increases.

The zoom lens according to the current exemplary embodiment may satisfy the following Equations 3 and 4:

$$1.45 < |f_2|/f_W < 1.7 \qquad (3)$$

$$0.32 < f_1/f_T < 0.55 \qquad (4).$$

In the zoom lens according to an exemplary embodiment, when a length from a vertex of the object side O of the lens 1, as the lens disposed closest to the object side O of the first lens group L1, to the image plane IP along the optical axis is ΣD (mm), the zoom lens may satisfy the following Equation 5:

$$0.6 < (\Sigma D/f_T) < 1.3 \qquad (5).$$

When (ΣD/$f_T$) is greater than the lower limit value of Equation 5, the overall length of the zoom lens decreases, but an astigmatic field curvature may not be easily corrected. On the other hand, when (ΣD/fT) is greater than the upper limit value of Equation 5, aberration correction is easily performed, but the overall length of the zoom lens increases.

Also, the zoom lens according to the current exemplary embodiment may satisfy the following Equation 6:

$$0.8 < (\Sigma D/f_T) < 1.2 \qquad (6).$$

In the zoom lens according to an exemplary embodiment, when the Abbe's number of the lens 1, which is the lens disposed closest to the object side O of the first lens group L1, is v1D, the zoom lens may satisfy the following Equation 7:

$$80 < v1D \qquad (7).$$

When v1D is less than the lower limit value of Equation 7, axial chromatic aberration and lateral chromatic aberration at the telephoto end may not be properly corrected.

The third lens group L3 may include the positive lens 9 having at least one aspherical surface and the convex surface on the object side O and the negative meniscus lens 10 having the concave surface on the image side I. Thus, spherical correction and coma correction may be easily performed.

When the object side O of the meniscus lens 10 has a curvature radius of R3W (mm) and the image side I of the meniscus lens 10 has a curvature radius of R3T (mm), the zoom lens may satisfy the following Equation 8:

$$1.5 < R3W/R3T < 3.0 \quad (8)$$

When R3W/R3T is less than the lower limit value of Equation 8, the position of the main point of the third lens group L3 is moved to the object side O, and the distance between the third lens group L3 and the fourth lens group L4 is small, and thus, the allowance for miniaturizing the zoom lens is reduced, and the overall length of the zoom lens increases. On the other hand, when R3W/R3T is greater than the upper limit value of Equation 8, the distance between the third lens group L3 and the fourth lens group L4 is very small. Thus, a space in which the fourth lens group L4 may move may not be sufficiently obtained.

The zoom lens according to the current exemplary embodiment may satisfy the following Equation 9:

$$2.0 < R3W/R3T < 2.5 \quad (9)$$

In the zoom lens according to an exemplary embodiment, when the focal length of the third lens group L3 is $f_3$ (mm), the zoom lens may satisfy the following Equation 10:

$$4.0 < f_3/f_W < 6.0 \quad (10)$$

When $f_3/f_W$ is less than the lower limit value of Equation 10, the positive refractive power of the third lens group L3 increases, while spherical aberration, coma aberration or astigmatism occurs, and the aforementioned aberration may not be easily corrected. On the other hand, when f3/fW is greater than the upper limit value of Equation 10, the positive refractive power of the third lens group L3 decreases, and the positive refractive power of the fourth lens group L4 increases. In this case, spherical aberration, coma aberration, astigmatism, and distortion aberration may not be properly corrected.

The zoom lens according to the current exemplary embodiment may satisfy the following Equation 11:

$$4.5 < f_3/f_W < 5.5 \quad (11)$$

In an exemplary embodiment, when lateral magnification during focusing on an object at infinity at the telephoto end is β4T, the fourth lens group L4 may satisfy the following Equation 12:

$$0.3 < \beta 4T < 0.6 \quad (12)$$

When β4T is less than the lower limit value of Equation 12, a back focal length increases, and the zoom lens increases in size. On the other hand, when β4T is greater than the upper limit value of Equation 12, the moving distances of the fourth lens group L4 increase, and the distance between the third lens group L3 and the fourth lens group L4 may be relatively big. Thus, the zoom lens may not be easily miniaturized.

The zoom lens according to the current exemplary embodiment may satisfy the following Equation 13:

$$0.35 < \beta 4T < 0.55 \quad (13)$$

The zoom lens that satisfies the aforementioned conditions has a high zooming rate. For example, the zoom lens according to the current embodiment may have a zooming rate of 15× to 25×. Also, a variation in distortion aberration at the wide angle end, spherical aberration at the telephoto end, and spherical aberration caused by zooming, or the like may be easily corrected, and a good optical performance from the wide angle end to the telephoto end may be obtained, and the overall length of the zoom lens may be reduced, thereby realizing miniaturization of the zoom lens.

Since the zoom lens according to the current exemplary embodiment has a small size and may correspond to a solid state imaging device having a large number of pixels, when the zoom lens is employed in a photographing optical system of a photographing apparatus, such as a surveillance camera, a digital video camera, a digital still camera, or the like, a photographing apparatus having a small size and a high optical performance may be realized.

Hereinafter, the effect of exemplary embodiments will be clarified. However, the present invention is not limited thereto and may be properly modified within the scope of the invention.

Figure 2:
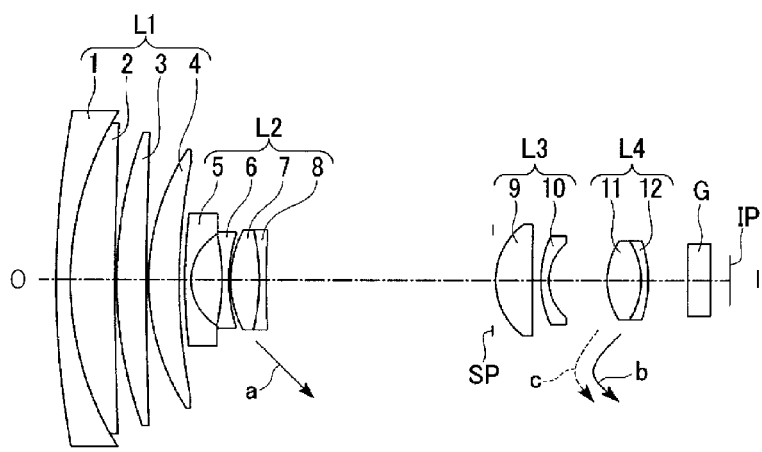
FIG. 2 is a cross-sectional view of a zoom lens according to another exemplary embodiment.

A structure of the zoom lens based on design data of a first exemplary embodiment is illustrated in FIG. 2. The zoom lens of FIG. 2 has the same structure as that of the zoom lens of FIG. 1, and the following tables 1, 2, and 3 show the design data of the zoom lens of FIG. 1.

TABLE 1

| Lens surface (i) | Lens (GjRk) | Radius of curvature (R) | Thickness (D) | Refractive index (Nd) | Abbe's number (Vd) |
|---|---|---|---|---|---|
| 1 | G1R1 | 118.64980 | 1.700 | 1.84666 | 23.78 |
| 2 | G1R2/G2R1 | 40.03122 | 5.617 | 1.49700 | 81.61 |
| 3 | G2R2 | 384.92901 | 0.200 | | |
| 4 | G3R1 | 55.34000 | 3.807 | 1.72916 | 54.67 |
| 5 | G3R2 | 979.81305 | 0.200 | | |
| 6 | G4R1 | 30.88549 | 3.798 | 1.77250 | 49.62 |
| 7 | G4R2 | 80.85718 | D1 | | |
| 8 | G5R1 | 67.13133 | 0.800 | 1.88300 | 40.80 |
| 9 | G5R2 | 6.83834 | 3.918 | | |
| 10 | G6R1 | −25.32670 | 0.800 | 1.83481 | 42.72 |
| 11 | G6R2 | 20.02199 | 0.200 | | |
| 12 | G7R1 | 13.28255 | 3.620 | 1.84666 | 23.78 |
| 13 | G7R2/G8R1 | −27.50218 | 0.850 | 1.77250 | 49.62 |
| 14 | G8R2 | 97.87753 | D2 | | |
| 15 | Iris diaphragm | 1.00E+18 | 0.350 | | |
| 16 | G9R1 | 8.24439 | 4.691 | 1.69350 | 53.20 |
| 17 | G9R2 | −626.92898 | 1.015 | | |
| 18 | G10R1 | 13.97634 | 1.000 | 1.84666 | 23.78 |
| 19 | G10R2 | 6.14653 | D3 | | |
| 20 | G11R1 | 9.35247 | 4.167 | 1.51633 | 64.06 |
| 21 | G11R2/G12R1 | −10.04080 | 0.900 | 1.84666 | 23.78 |
| 22 | G12R2 | −17.66512 | D4 | | |
| 23 | Plane | 1.00E+18 | 2.880 | 1.51680 | 64.20 |
| 24 | Plane | 1.00E+18 | 2.430 | | |

TABLE 2

| | Wide angle end | Middle end | Telephoto end |
|---|---|---|---|
| Focal length | 4.63 | 20.39 | 83.00 |
| F number | 1.64 | 2.26 | 2.91 |
| D1 | 0.65 | 17.95929 | 26.3735 |
| D2 | 28.27627 | 10.96698 | 2.552771 |
| D3 | 7.296295 | 3.465589 | 10.93191 |
| D4 | 4.835614 | 8.66632 | 1.2 |

TABLE 3

| | Number of surfaces | | |
|---|---|---|---|
| | 16 | 17 | 20 |
| C | 0.121294563 | −0.001595077 | 0.106923587 |
| K | −0.5 | 0 | 0 |
| $A_4$ | −2.8469E−05 | 4.5773E−05 | −1.0425E−04 |
| $A_6$ | 1.5268E−08 | 0.0000E+00 | −4.2529E−07 |
| $A_8$ | 0.0000E+00 | 0.0000E+00 | 0.0000E+00 |
| $A_{10}$ | 0.0000E+00 | 0.0000E+00 | 0.0000E+00 | i of the lens surface column (where i is a natural number) in Table 1 represents the position of a lens surface when a first surface is a lens surface closest to the object side O and a last surface is a lens surface closest to the image side I. In a lens GjRk of the lens column in Table 1 (where j is a natural number and k is 1 or 2), j represents the position of a lens when a first lens is a lens closest to the object side O and a last lens is a lens closest to the image side I. k represents a lens surface of the object side O when set as 1 and a lens surface of the image side I when set as 2.

In Table 1, R represents a curvature radius (mm) of a lens surface.

In Table 1, D represents an axial surface distance (mm) between an i-th lens surface and an (i+1)-th lens surface at the object side O, and when D varies, D represents an axial surface distance (mm) at the wide angle end, the middle end, or the telephoto end. Meanwhile, the focal length and the F number of the zoom lens at the wide angle end, the middle end, and the telephoto end, respectively, are indicated in Table 2.

In Table 1, Nd represents a refractive index, and Vd represents an Abbe's number.

Table 3 shows the number of surfaces and an aspherical coefficient of an aspherical lens. The aspherical surface may be indicated using the following aspherical Equation x.

$$x = \frac{(ch)^2}{1 + \sqrt{1 - (k+1)c^2 h^2}} + \sum_{i=2}^{6} A_{2i} h^{2i},$$

where x is a distance from a vertex of a lens in optical axis direction, h is a distance in a direction perpendicular to the optical axis, K is a conic constant, Ai is an aspherical coefficient, and c is a reverse number (1/R) of a curvature radius at the vertex of the lens.

Figure 3:
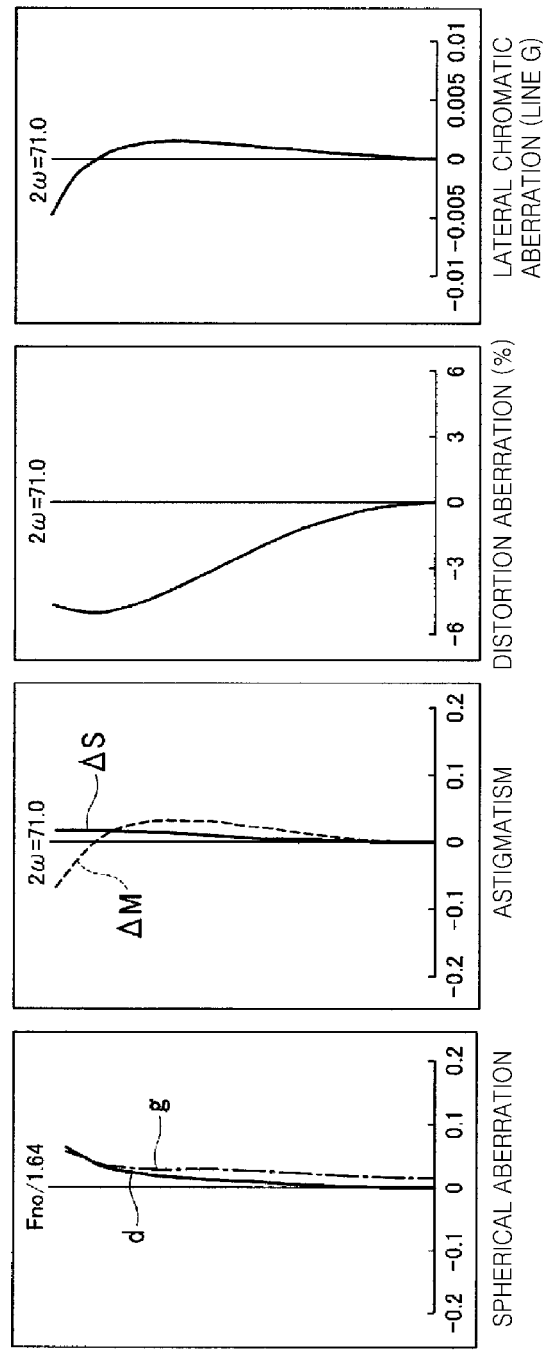
FIG. 3 are charts of aberration showing spherical aberration, astigmatism, distortion aberration, and at a wide angle end of the zoom lens of FIG. 2, respectively.
Figure 4:
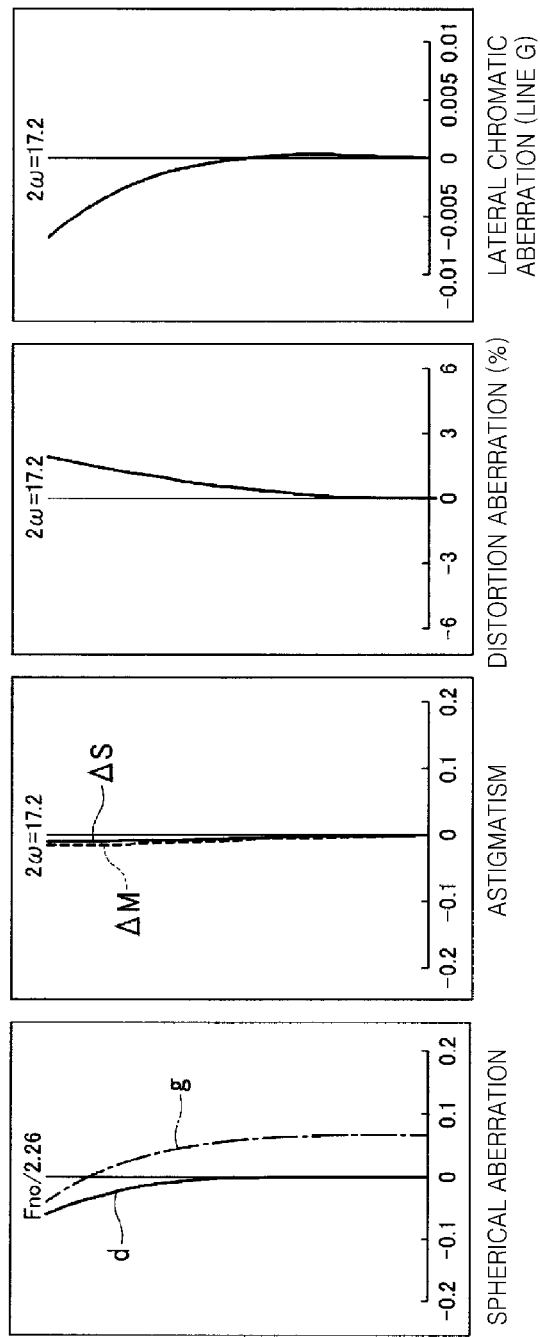
FIG. 4 are charts of aberration showing spherical aberration, astigmatism, distortion aberration, and lateral chromatic aberration at a middle end of the zoom lens of FIG. 2, respectively.
Figure 5:
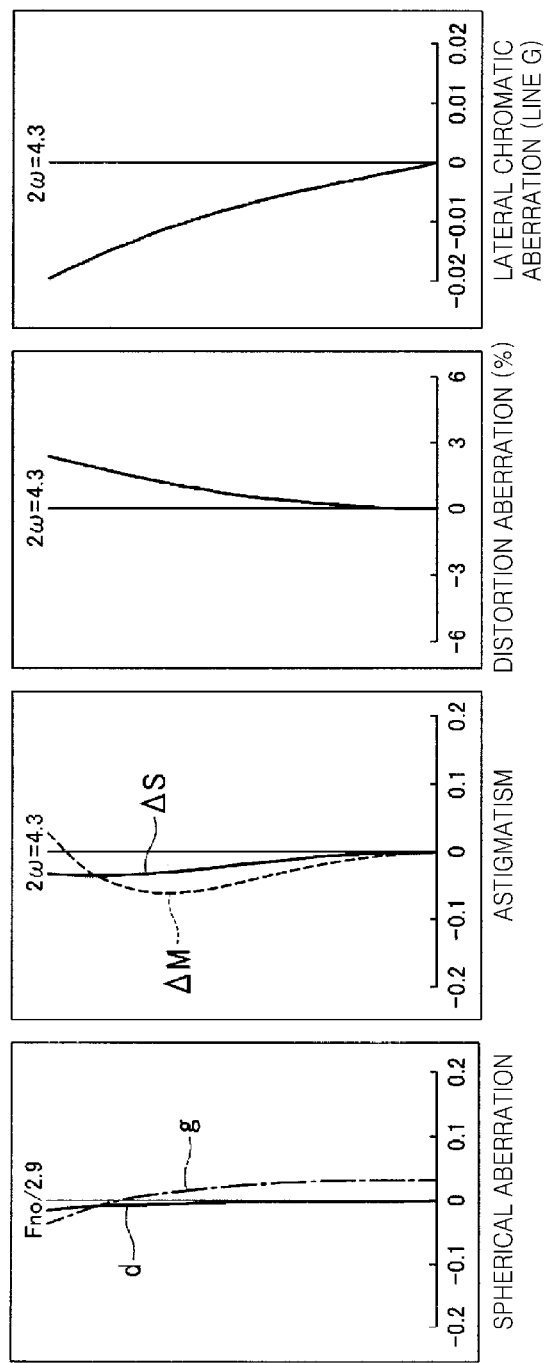
FIG. 5 are charts of aberration showing spherical aberration, astigmatism, distortion aberration, and lateral chromatic aberration at a telephoto end of the zoom lens of FIG. 2, respectively.

Spherical aberration, astigmatism, distortion aberration, and chromatic difference of magnification of the zoom lens having the above structure according to the first exemplary embodiment are shown in FIGS. 3, 4, and 5.

FIG. 3 illustrates aberrations at the wide angle end, and FIG. 4 illustrates aberrations at the middle end, and FIG. 5 illustrates aberrations at the telephoto end.

Spherical aberration for d-line is indicated by a solid line, and spherical aberration for g-line is indicated by a one-dot oblique line. Astigmatism is represented by a saggital ray ΔS and a meridional ray ΔM for each wavelength. Distortion aberration is represented for a wavelength of 587.56 nm. Lateral chromatic aberration for g-line of magnification is represented by a line.

The zoom lens according to the first exemplary embodiment has a zooming rate of about 17.9× and may properly correct each of the aforementioned aberration, as illustrated in FIGS. 3, 4, and 5.

Figure 6:
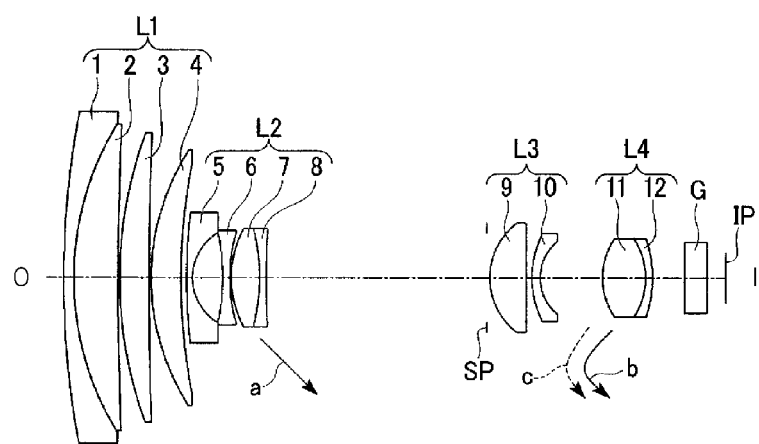
FIG. 6 is a cross-sectional view of a zoom lens according to another exemplary embodiment.

A structure of a zoom lens based on design data of a second embodiment is shown in FIG. 6. The zoom lens of FIG. 6 according to the second exemplary embodiment has the same structure as that of the zoom lens of FIG. 1, and the following table 4 shows the design data of the zoom lens.

The variables and identifiers of table 4 are the same as that of table 1.

TABLE 4

| Lens surface (i) | Lens (GjRk) | Radius of curvature (R) | Thickness (D) | Refractive index (Nd) | Abbe's number (Vd) |
|---|---|---|---|---|---|
| 1 | G1R1 | 108.39785 | 1.300 | 1.84666 | 23.78 |
| 2 | G1R2/G2R1 | 38.80964 | 5.687 | 1.49700 | 81.61 |
| 3 | G2R2 | 321.41392 | 0.200 | | |
| 4 | G3R1 | 56.99701 | 3.705 | 1.72916 | 54.67 |
| 5 | G3R2 | 809.02699 | 0.200 | | |
| 6 | G4R1 | 30.82923 | 3.876 | 1.77250 | 49.62 |
| 7 | G4R2 | 84.51211 | D1 | | |
| 8 | G5R1 | 53.28842 | 0.800 | 1.88300 | 40.80 |
| 9 | G5R2 | 6.72058 | 4.192 | | |
| 10 | G6R1 | −21.75523 | 0.800 | 1.83481 | 42.72 |
| 11 | G6R2 | 29.36278 | 0.200 | | |
| 12 | G7R1 | 14.26015 | 3.653 | 1.84666 | 23.78 |
| 13 | G7R2/G8R1 | −24.07464 | 0.850 | 1.77250 | 49.62 |
| 14 | G8R2 | 49.31345 | D2 | | |
| 15 | Iris diaphragm | 1.00E+18 | 0.350 | | |
| 16 | G9R1 | 8.08558 | 4.700 | 1.69350 | 53.20 |
| 17 | G9R2 | −1066.85368 | 0.699 | | |
| 18 | G10R1 | 12.97788 | 1.000 | 1.84666 | 23.78 |
| 19 | G10R2 | 6.01215 | D3 | | |
| 20 | G11R1 | 9.34494 | 5.507 | 1.48749 | 70.20 |
| 21 | G11R2/G12R1 | −9.79114 | 0.900 | 1.84666 | 23.78 |
| 22 | G12R2 | −16.50220 | D4 | | |
| 23 | Plane | 1.00E+18 | 2.880 | 1.51680 | 64.20 |
| 24 | Plane | 1.00E+18 | 2.430 | | |

Figure 7:
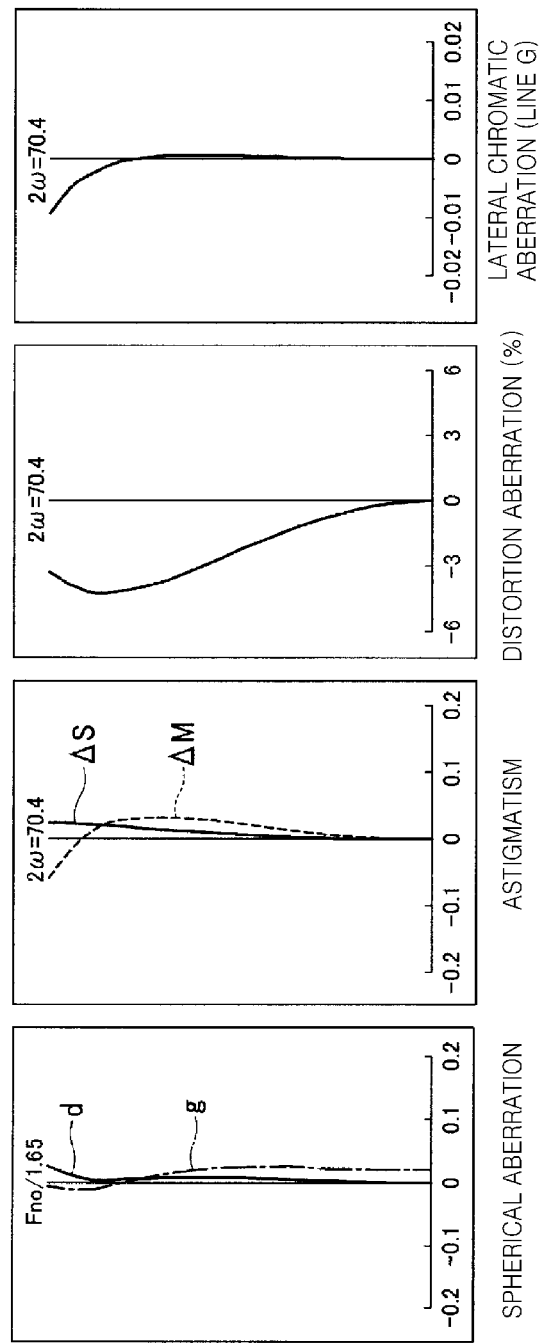
FIG. 7 are charts of aberration showing spherical aberration, astigmatism, distortion aberration, and lateral chromatic aberration at a wide angle end of the zoom lens of FIG. 6, respectively.
Figure 8:
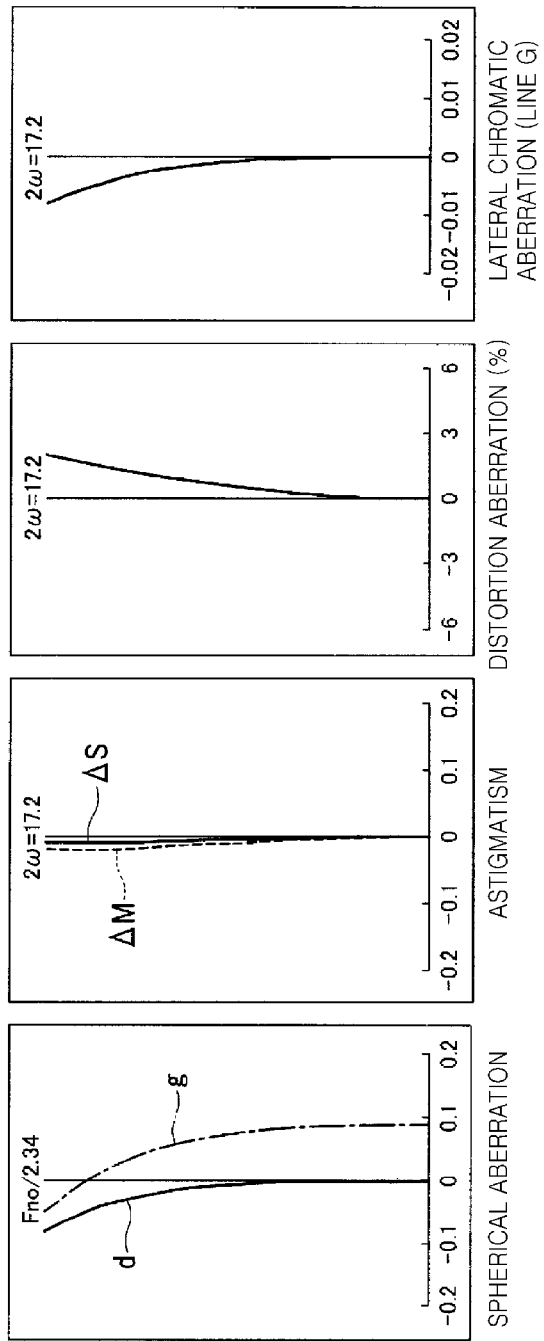
FIG. 8 are charts of aberration showing spherical aberration, astigmatism, distortion aberration, and lateral chromatic aberration at a middle end of the zoom lens of FIG. 6, respectively.
Figure 9:
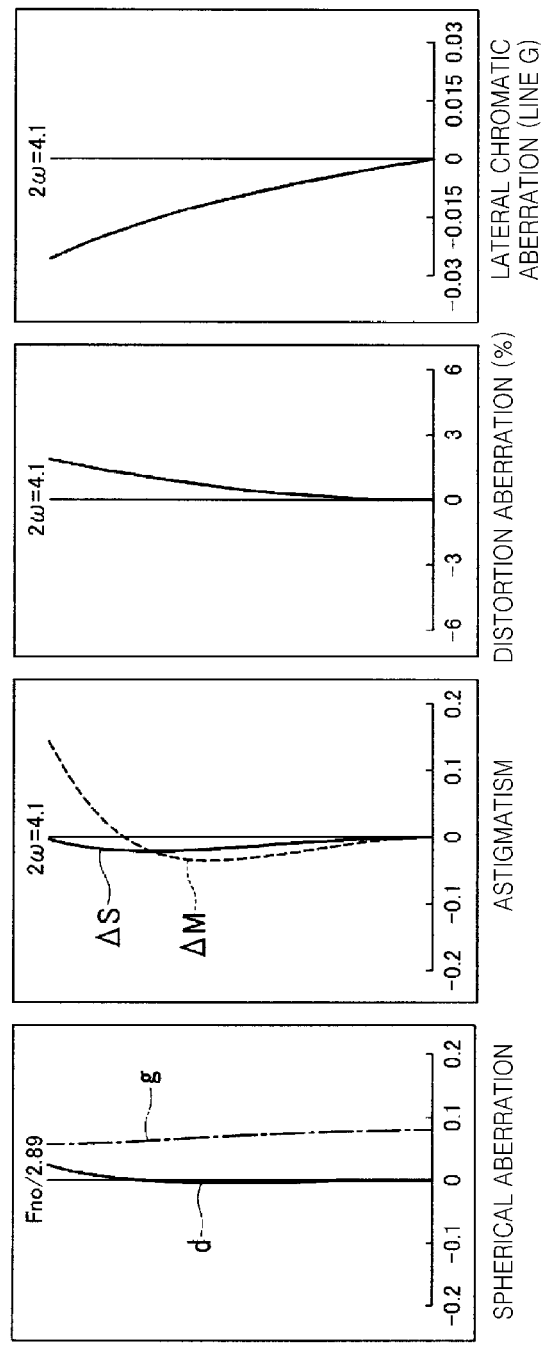
FIG. 9 are charts of aberration showing spherical aberration, astigmatism, distortion aberration, and lateral chromatic aberration at a telephoto end of the zoom lens of FIG. 6, respectively.

Spherical aberration, astigmatism, distortion aberration, and chromatic aberration of magnification of the zoom lens according to the second exemplary embodiment are shown in FIGS. 7, 8, and 9. Illustrative representations of FIGS. 7 through 9 are similar to those of FIGS. 3 through 5.

The zoom lens of the second exemplary embodiment satisfies conditions, as illustrated in Table 4. The zoom lens of the second exemplary embodiment has a zooming rate of about 18.8× and may properly correct each of the aforementioned aberrations, as illustrated in FIGS. 7, 8, and 9.

TABLE 5

| | Wide angle end | Middle end | Telephoto end |
|---|---|---|---|
| Focal length | 4.62 | 20.39 | 87.00 |
| F number | 1.65 | 2.34 | 2.89 |
| D1 | 0.65 | 17.8287 | 26.36515 |
| D2 | 28.27627 | 11.09757 | 2.561119 |
| D3 | 8.081343 | 3.618478 | 11.28494 |
| D4 | 4.203596 | 8.66646 | 1 |

TABLE 6

| | 16 | 17 | 20 |
|---|---|---|---|
| C | 0.123676907 | −0.000937336 | 0.10700982 |
| K | −0.5 | 0 | 0 |
| $A_4$ | −2.8469E−05 | 4.5773E−05 | −1.0425E−04 |
| $A_6$ | 1.5268E−08 | 0.0000E+00 | −4.2529E−07 |
| $A_8$ | 0.0000E+00 | 0.0000E+00 | 0.0000E+00 |
| $A_{10}$ | 0.0000E+00 | 0.0000E+00 | 0.0000E+00 |

Figure 10:
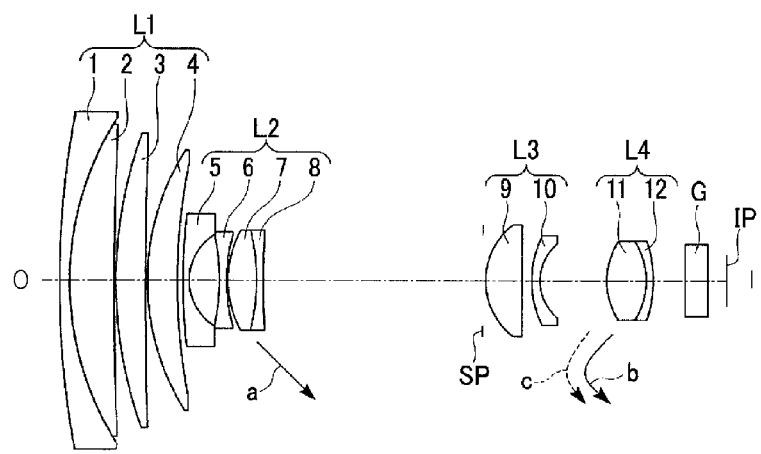
FIG. 10 is a cross-sectional view of a zoom lens according to another exemplary embodiment.

A structure of a zoom lens based on design data of a third exemplary embodiment is shown in FIG. 10. The zoom lens of FIG. 10 has the same structure as that of the zoom lens of FIG. 1, and the following tables 7, 8, and 9 show the design data of the zoom lens. The variables and identifiers of tables 7, 8, and 9 are the same as those of tables 1, 2, and 3.

TABLE 7

| Lens surface (i) | Lens (GjRk) | Radius of curvature (R) | Thickness (D) | Refractive index (Nd) | Abbe's number (Vd) |
|---|---|---|---|---|---|
| 1 | G1R1 | 104.76570 | 1.300 | 1.84666 | 23.78 |
| 2 | G1R2/G2R1 | 38.20108 | 5.824 | 1.49700 | 81.61 |
| 3 | G2R2 | 276.67561 | 0.200 | | |
| 4 | G3R1 | 55.95163 | 3.825 | 1.72916 | 54.67 |
| 5 | G3R2 | 750.23130 | 0.200 | | |
| 6 | G4R1 | 31.14282 | 3.885 | 1.77250 | 49.62 |
| 7 | G4R2 | 87.13674 | D1 | | |
| 8 | G5R1 | 71.23104 | 0.800 | 1.88300 | 40.80 |
| 9 | G5R2 | 6.68350 | 4.050 | | |
| 10 | G6R1 | −28.14992 | 0.800 | 1.83481 | 42.72 |
| 11 | G6R2 | 22.41795 | 0.200 | | |
| 12 | G7R1 | 12.78157 | 3.713 | 1.84666 | 23.78 |
| 13 | G7R2/G8R1 | −30.47981 | 0.850 | 1.77250 | 49.62 |
| 14 | G8R2 | 45.02467 | D2 | | |
| 15 | Iris diaphragm | 1.00E+18 | 0.350 | | |
| 16 | G9R1 | 8.01727 | 4.700 | 1.69350 | 53.20 |
| 17 | G9R2 | −704.05940 | 1.061 | | |
| 18 | G10R1 | 13.07743 | 1.000 | 1.84666 | 23.78 |
| 19 | G10R2 | 5.74667 | D3 | | |
| 20 | G11R1 | 8.85432 | 5.000 | 1.48749 | 70.20 |
| 21 | G11R2/G12R1 | −10.04982 | 0.900 | 1.84666 | 23.78 |
| 22 | G12R2 | −16.24472 | D4 | | |
| 23 | Plane | 1.00E+18 | 2.880 | 1.51680 | 64.20 |
| 24 | Plane | 1.00E+18 | 2.430 | | |

TABLE 8

| | Wide angle end | Middle end | Telephoto end |
|---|---|---|---|
| Focal length | 4.66 | 20.39 | 88.75 |
| F number | 1.66 | 2.33 | 2.93 |
| D1 | 0.65 | 17.88103 | 26.36515 |
| D2 | 28.27627 | 11.04524 | 2.561119 |
| D3 | 8.653215 | 4.285486 | 11.95116 |
| D4 | 4.297942 | 8.66567 | 1 |

TABLE 9

| | Number of surfaces | | |
|---|---|---|---|
| | 16 | 17 | 20 |
| C | 0.124730744 | −0.001420335 | 0.112939278 |
| K | −0.47 | 0 | 0 |
| $A_4$ | −3.0048E−05 | 5.8845E−05 | −1.0425E−04 |
| $A_6$ | −1.0071E−07 | 0.0000E+00 | −3.7396E−07 |
| $A_8$ | 2.3587E−09 | 0.0000E+00 | 0.0000E+00 |
| $A_{10}$ | 0.0000E+00 | 0.0000E+00 | 0.0000E+00 |

Figure 11:
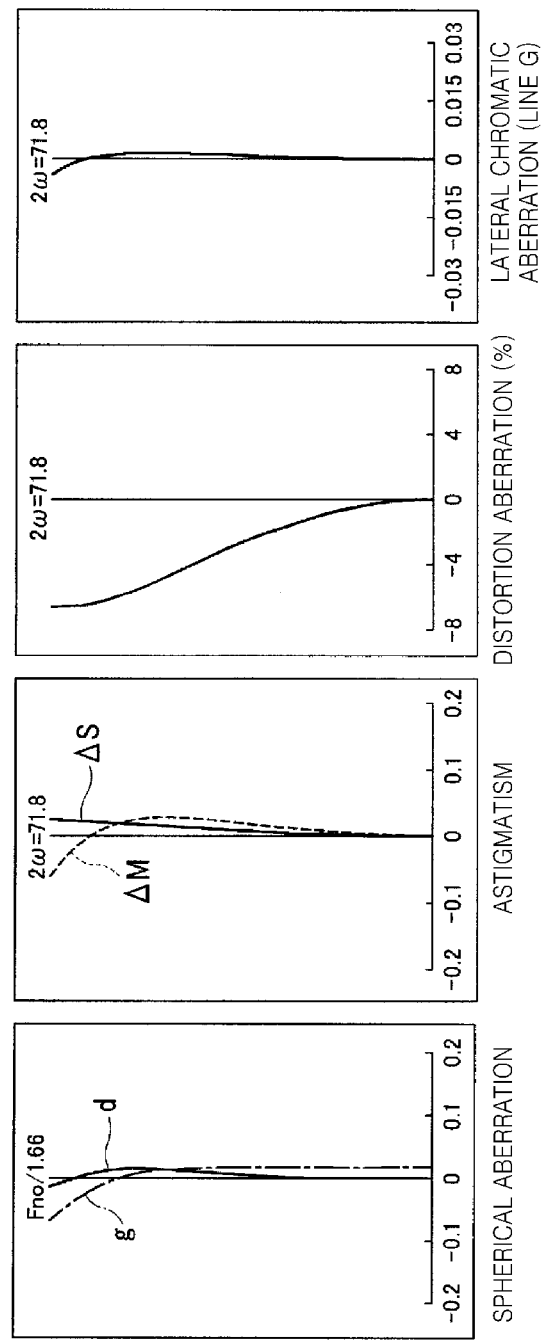
FIG. 11 are charts of aberration showing spherical aberration, astigmatism, distortion aberration, and lateral chromatic aberration at a wide angle end of the zoom lens of FIG. 10, respectively.
Figure 12:
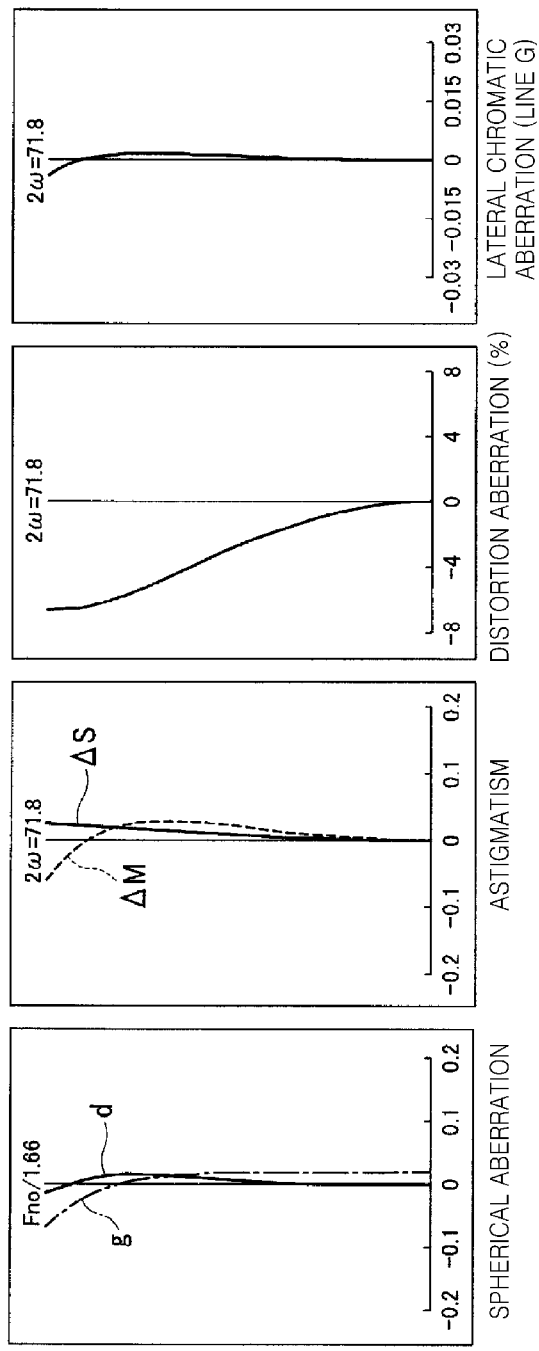
FIG. 12 are charts of aberration showing spherical aberration, astigmatism, distortion aberration, and lateral chromatic aberration at a middle end of the zoom lens of FIG. 10, respectively.
Figure 13:
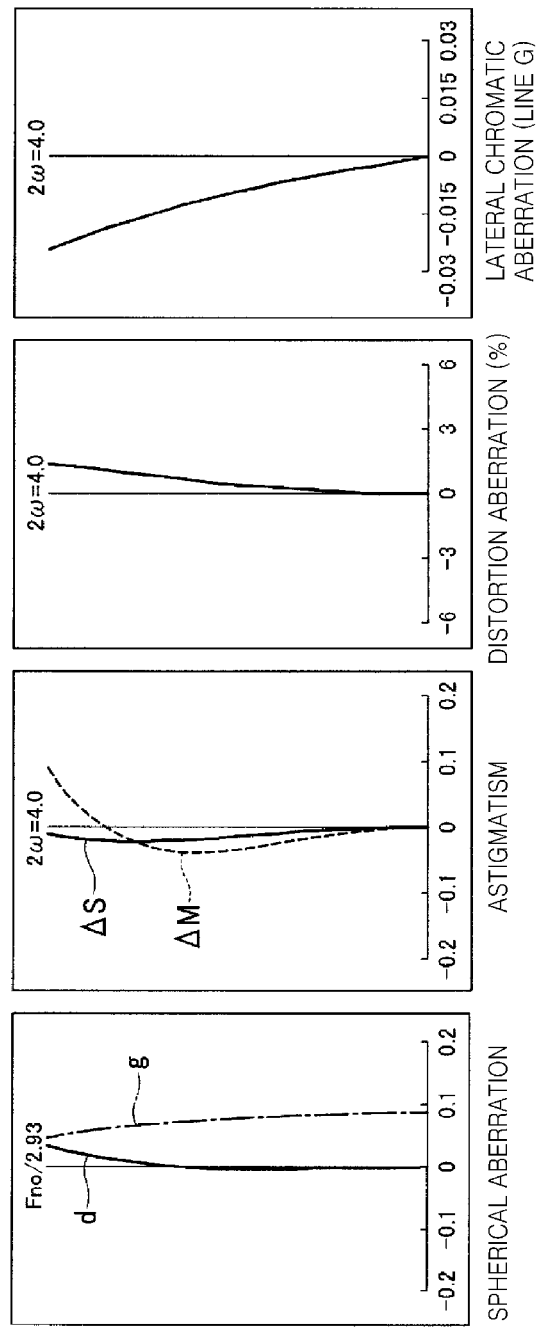
FIG. 13 are charts of aberration showing spherical aberration, astigmatism, distortion aberration, and lateral chromatic aberration at a telephoto end of the zoom lens of FIG. 10, respectively.

Spherical aberration, astigmatism, distortion aberration, and chromatic difference of magnification of the zoom lens having the above structure according to the third exemplary embodiment are shown in FIGS. 11, 12, and 13. The descriptions of FIGS. 11, 12, and 13 are similar to those above with respect to FIGS. 3 through 5.

The zoom lens of the third exemplary embodiment has a zooming rate of about 19.0× and may properly correct each of the aforementioned aberration, as illustrated in FIGS. 11, 12, and 13.

Figure 14:
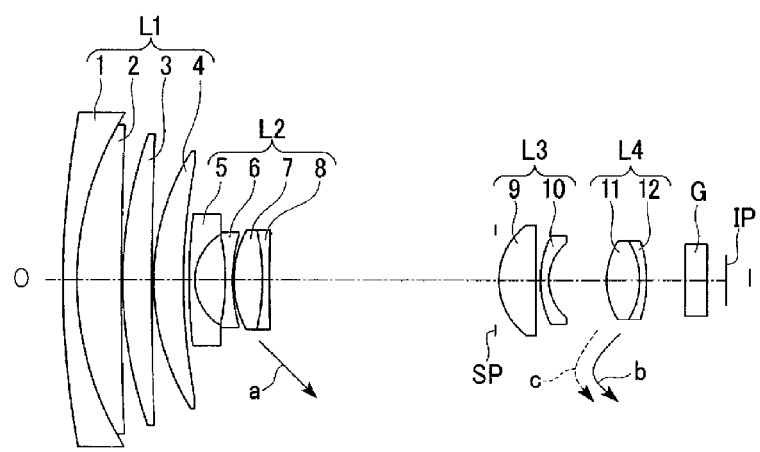
FIG. 14 is a cross-sectional view of a zoom lens according to another exemplary embodiment.

A structure of a zoom lens based on design data of a fourth exemplary embodiment is shown in FIG. 14. The zoom lens of FIG. 14 has the same structure as that of the zoom lens of FIG. 1, and the following tables 13 through 15 show the design data of the zoom lens of the fourth exemplary embodiment. Also, variables and identifiers of tables 13 through 15 are the same as those described above with respect to tables 1 through 3.

TABLE 10

| Lens surface (i) | Lens (GjRk) | Radius of curvature (R) | Thickness (D) | Refractive index (Nd) | Abbe's number (Vd) |
|---|---|---|---|---|---|
| 1 | G1R1 | 127.86685 | 1.582 | 1.84666 | 23.78 |
| 2 | G1R2/G2R1 | 41.01482 | 5.609 | 1.49700 | 81.61 |
| 3 | G2R2 | 548.55597 | 0.200 | | |
| 4 | G3R1 | 55.63303 | 3.738 | 1.72916 | 54.67 |
| 5 | G3R2 | 782.60841 | 0.200 | | |
| 6 | G4R1 | 30.54129 | 3.844 | 1.77250 | 49.62 |
| 7 | G4R2 | 79.27478 | D1 | | |
| 8 | G5R1 | 67.49803 | 0.800 | 1.88300 | 40.80 |
| 9 | G5R2 | 6.73144 | 3.616 | | |
| 10 | G6R1 | −27.45549 | 0.800 | 1.83481 | 42.72 |
| 11 | G6R2 | 17.85686 | 0.200 | | |
| 12 | G7R1 | 12.42626 | 4.035 | 1.84666 | 23.78 |
| 13 | G7R2/G8R1 | −32.76014 | 0.850 | 1.77250 | 49.62 |
| 14 | G8R2 | 117.77246 | D2 | | |
| 15 | Iris diaphragm | 1.00E+18 | 0.350 | | |
| 16 | G9R1 | 8.37333 | 4.700 | 1.69350 | 53.20 |
| 17 | G9R2 | −708.17294 | 0.489 | | |
| 18 | G10R1 | 14.04082 | 1.000 | 1.84666 | 23.78 |
| 19 | G10R2 | 6.64997 | D3 | | |
| 20 | G11R1 | 10.27168 | 4.110 | 1.51633 | 64.06 |
| 21 | G11R2/G12R1 | −9.75173 | 0.900 | 1.84666 | 23.78 |
| 22 | G12R2 | −17.86303 | D4 | | |
| 23 | Plane | 1.00E+18 | 2.880 | 1.51680 | 64.20 |
| 24 | Plane | 1.00E+18 | 2.430 | | |

TABLE 11

| | Wide angle end | Middle end | Telephoto end |
|---|---|---|---|
| Focal length | 4.65 | 20.39 | 80.00 |
| F number | 1.64 | 2.23 | 2.86 |
| D1 | 0.65 | 18.07722 | 26.3735 |
| D2 | 28.27627 | 10.84905 | 2.552771 |
| D3 | 7.257847 | 3.534748 | 11.00108 |
| D4 | 4.943229 | 8.666328 | 1.2 |

TABLE 12

| | Number of surfaces | | |
|---|---|---|---|
| | 16 | 17 | 20 |
| C | 0.119426759 | −0.001412084 | 0.097355071 |
| K | −0.5 | 0 | 0 |
| $A_4$ | −2.8469E−05 | 4.5773E−05 | −1.0425E−04 |
| $A_6$ | 1.5268E−08 | 0.0000E+00 | −4.2529E−07 |
| $A_8$ | 0.0000E+00 | 0.0000E+00 | 0.0000E+00 |
| $A_{10}$ | 0.0000E+00 | 0.0000E+00 | 0.0000E+00 |

Figure 15:
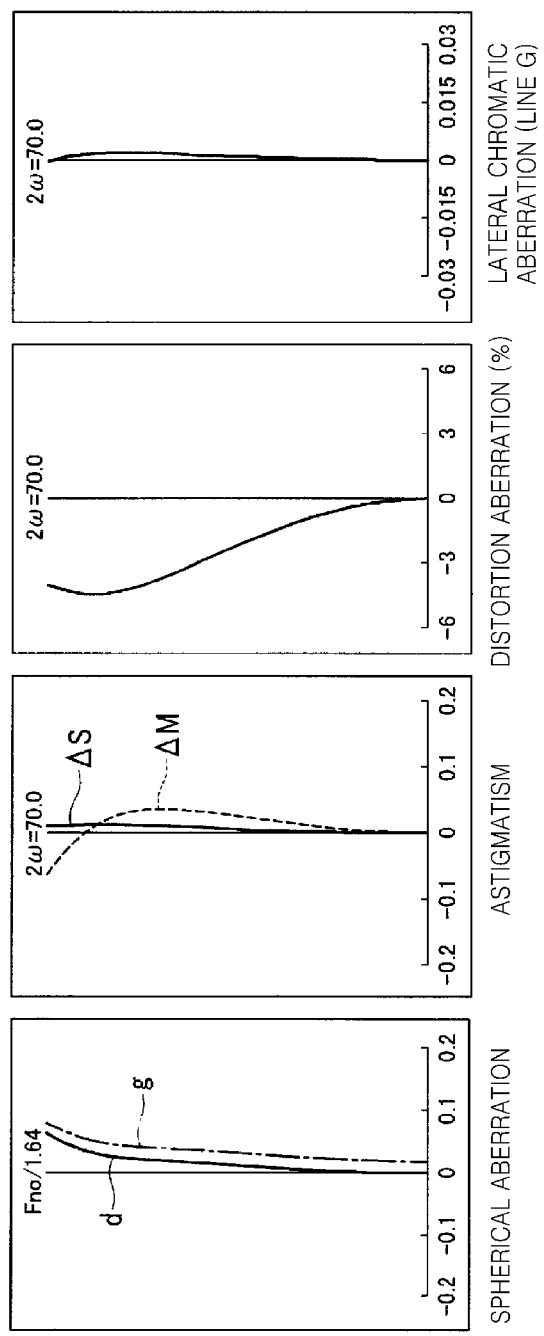
FIG. 15 are charts of aberration showing spherical aberration, astigmatism, distortion aberration, and lateral chromatic aberration at a wide angle end of the zoom lens of FIG. 14, respectively.
Figure 16:
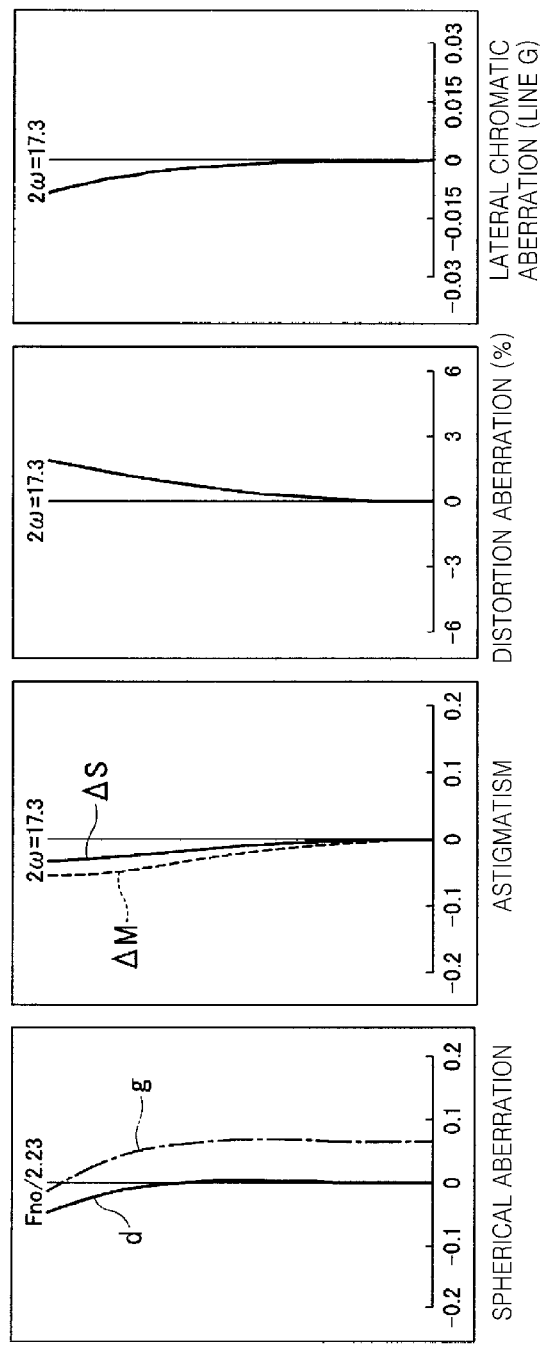
FIG. 16 are charts of aberration showing spherical aberration, astigmatism, distortion aberration, and lateral chromatic aberration at a middle end of the zoom lens of FIG. 14, respectively.
Figure 17:
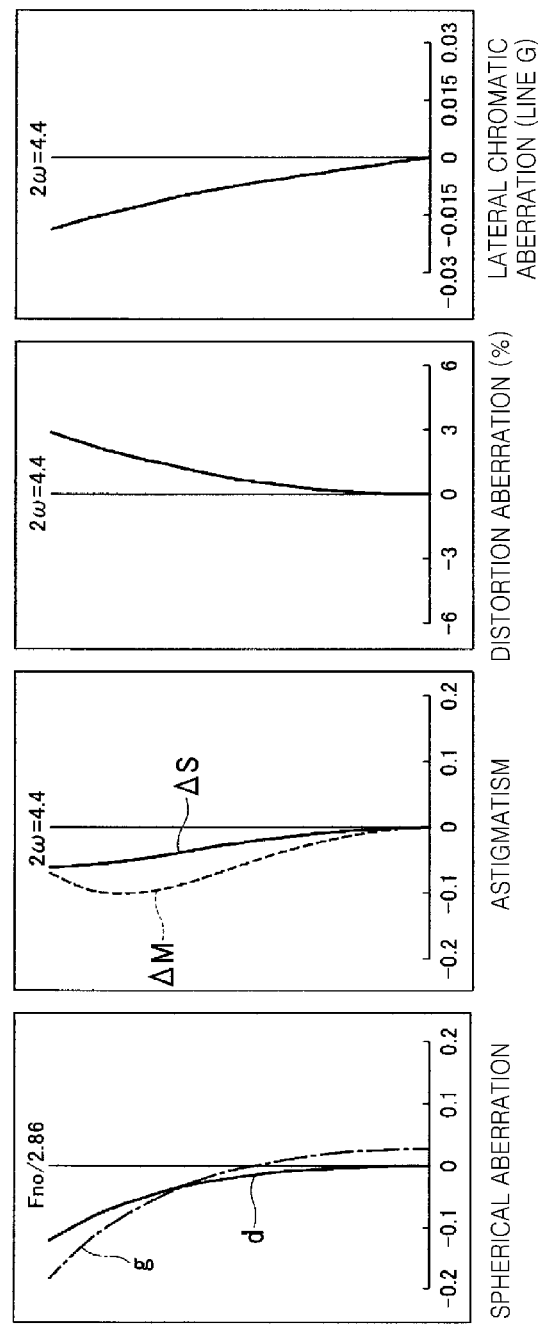
FIG. 17 are charts of aberration showing spherical aberration, astigmatism, distortion aberration, and lateral chromatic aberration at a telephoto end of the zoom lens of FIG. 15, respectively.

Spherical aberration, astigmatism, distortion aberration, and chromatic difference of magnification the zoom lens having the above structure according to the fourth exemplary embodiment are shown in FIGS. 15, 16, and 17. The illustrative representations of FIGS. 15, 16, and 17 are similar to those of FIGS. 3 through 5.

The zoom lens of the fourth exemplary embodiment has a zooming rate of about 17.2× and may properly correct each of the aforementioned aberration, as illustrated in FIGS. 15, 16, and 17.

Figure 18:
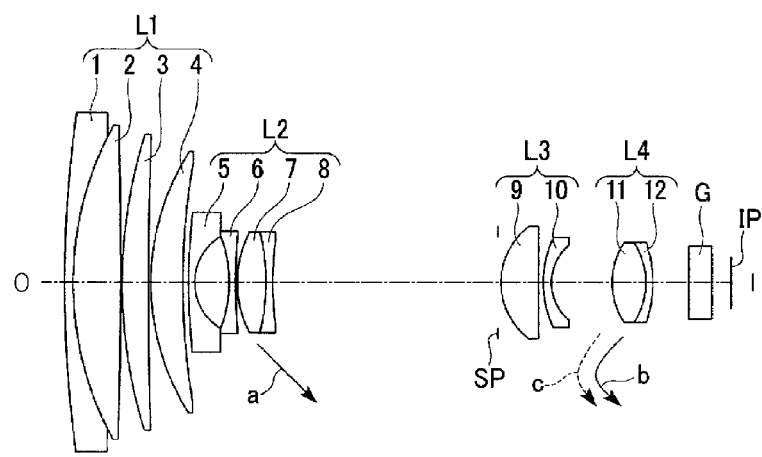
FIG. 18 is a cross-sectional view of a zoom lens according to another exemplary embodiment.

A structure of a zoom lens based on design data of a fifth exemplary embodiment is shown in FIG. 18. The zoom lens of FIG. 18 has the same structure as that of the zoom lens of FIG. 1, and the following tables 13, 14, and 15 show the design data of the zoom lens of the fifth exemplary embodiment. The variables and identifiers of tables 13, 14, and 15 are the same as those of tables 1, 2, and 3.

TABLE 13

| Lens surface (i) | Lens ((GjRk)) | Radius of curvature (R) | Thickness (D) | Refractive index (Nd) | Abbe's number (Vd) |
|---|---|---|---|---|---|
| 1 | G1R1 | 163.09425 | 1.200 | 1.84666 | 23.78 |
| 2 | G1R2/G2R1 | 44.00423 | 5.821 | 1.49700 | 81.61 |
| 3 | G2R2 | −1000.00000 | 0.200 | | |
| 4 | G3R1 | 63.34724 | 3.462 | 1.72916 | 54.67 |
| 5 | G3R2 | 1000.00000 | 0.200 | | |
| 6 | G4R1 | 30.27719 | 4.070 | 1.77250 | 49.62 |
| 7 | G4R2 | 84.72659 | D1 | | |
| 8 | G5R1 | 66.47501 | 0.800 | 1.88300 | 40.80 |
| 9 | G5R2 | 7.10296 | 4.265 | | |
| 10 | G6R1 | −19.72125 | 0.800 | 1.83481 | 42.72 |
| 11 | G6R2 | 70.85877 | 0.200 | | |
| 12 | G7R1 | 15.51835 | 3.639 | 1.84666 | 23.78 |
| 13 | G7R2/G8R1 | −23.27269 | 0.850 | 1.77250 | 49.62 |
| 14 | G8R2 | 33.96808 | D2 | | |
| 15 | Iris diaphragm | 1.00E+18 | 0.350 | | |
| 16 | G9R1 | 7.95404 | 4.700 | 1.69350 | 53.20 |
| 17 | G9R2 | 1000.00000 | 0.611 | | |
| 18 | G10R1 | 12.37741 | 1.000 | 1.84666 | 23.78 |
| 19 | G10R2 | 5.90478 | D3 | | |
| 20 | G11R1 | 9.09761 | 4.246 | 1.51633 | 64.06 |
| 21 | G11R2/G12R1 | −9.76915 | 0.900 | 1.84666 | 23.78 |
| 22 | G12R2 | −17.05484 | D4 | | |
| 23 | Plane | 1.00E+18 | 2.880 | 1.51680 | 64.20 |
| 24 | Plane | 1.00E+18 | 2.430 | | |

TABLE 14

| | Wide angle end | Middle end | Telephoto End |
|---|---|---|---|
| Focal length | 4.60 | 20.39 | 76.00 |
| F number | 1.65 | 2.28 | 2.82 |
| D1 | 0.65 | 17.84228 | 25.96043 |
| D2 | 28.27627 | 11.08399 | 2.965845 |
| D3 | 7.608525 | 3.480579 | 9.769246 |
| D4 | 4.538654 | 8.6666 | 2.377933 |

TABLE 15

| | Number of surfaces | | |
|---|---|---|---|
| | 16 | 17 | 20 |
| C | 0.12572226 | 0.001 | 0.109919025 |
| K | −0.5 | 0 | 0 |
| $A_4$ | −2.8469E−05 | 4.5773E−05 | −1.0425E−04 |
| $A_6$ | 1.5268E−08 | 0.0000E+00 | −4.2529E−07 |
| $A_8$ | 0.0000E+00 | 0.0000E+00 | 0.0000E+00 |
| $A_{10}$ | 0.0000E+00 | 0.0000E+00 | 0.0000E+00 |

Figure 19:
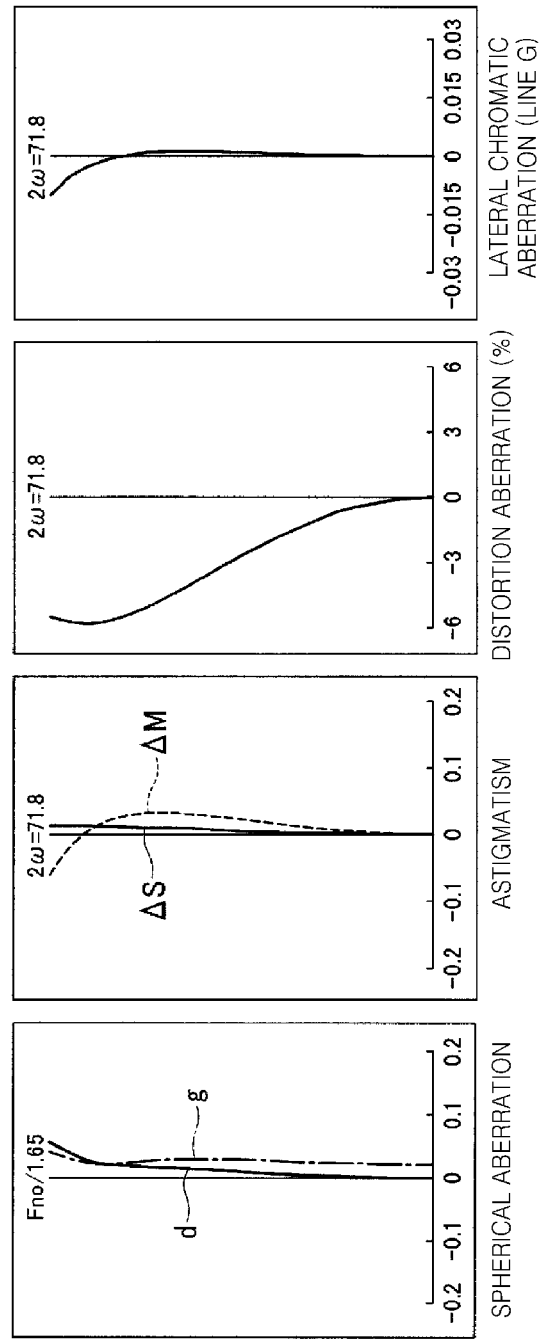
FIG. 19 are charts of aberration showing spherical aberration, astigmatism, distortion aberration, and lateral chromatic aberration at a wide angle end of the zoom lens of FIG. 18, respectively.
Figure 20:
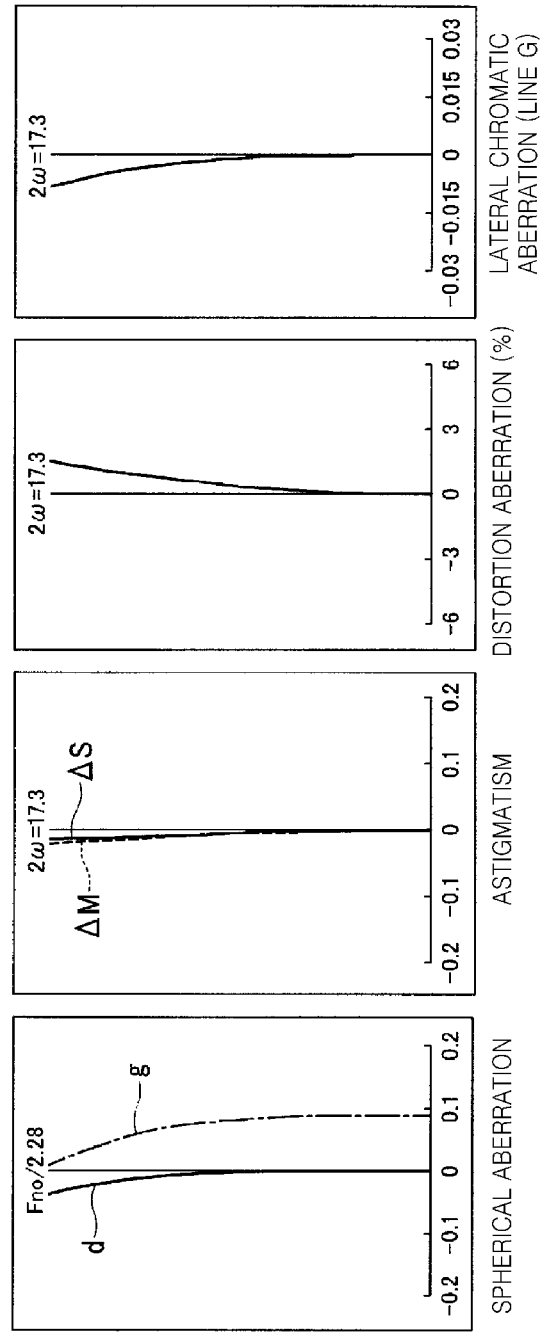
FIG. 20 are charts of aberration showing spherical aberration, astigmatism, distortion aberration, and lateral chromatic aberration at a middle end of the zoom lens of FIG. 18, respectively.
Figure 21:
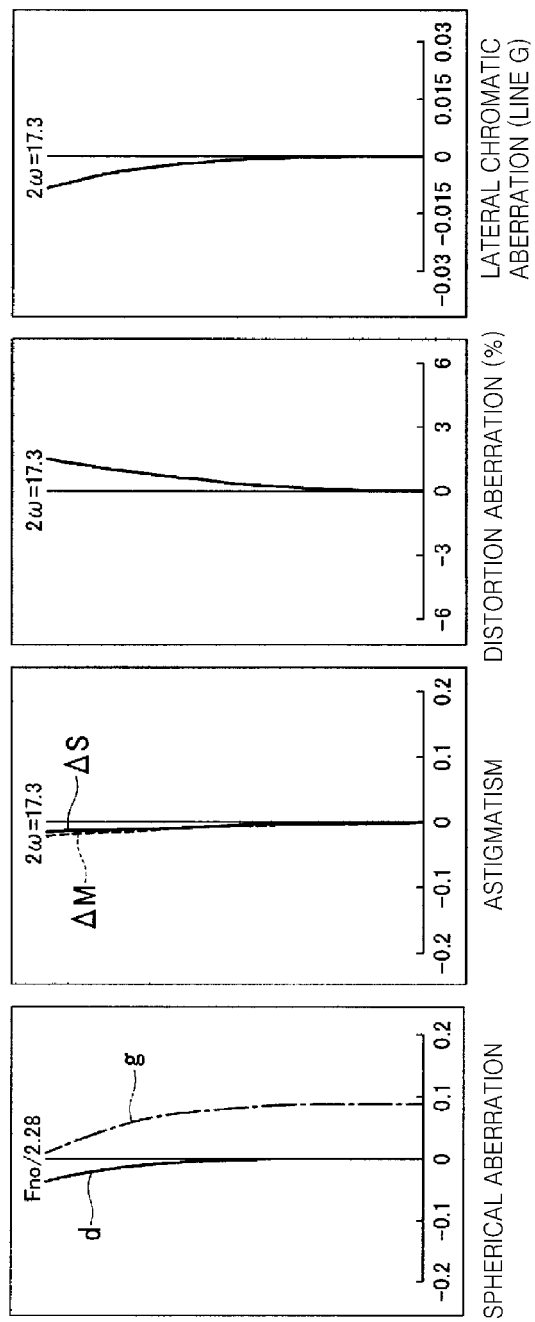
FIG. 21 are charts of aberration showing spherical aberration, astigmatism, distortion aberration, and lateral chromatic aberration at a telephoto end of the zoom lens of FIG. 18, respectively.

Spherical aberration, astigmatism, distortion aberration, and chromatic difference of magnification of the zoom lens having the above structure according to the fifth exemplary embodiment are shown in FIGS. 19, 20, and 21. The illustrative representations of FIGS. 19, 20, and 21 are similar to those of FIGS. 3 through 5.

The zoom lens of the fifth exemplary embodiment has a zooming rate of approximately 16.5× and may properly correct each of the aforementioned aberration, as illustrated in FIGS. 19, 20, and 21.

Figure 22:
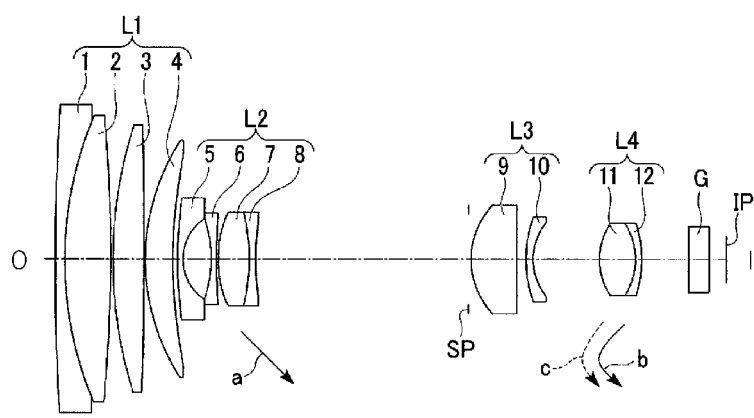
FIG. 22 is a cross-sectional view of a zoom lens according to another exemplary embodiment.

A structure of a zoom lens based on design data of a sixth exemplary embodiment is shown in FIG. 22. The zoom lens of FIG. 22 has the same structure as that of the zoom lens of FIG. 1, and the following tables 16, 17, and 18 show the design data of the zoom lens of the sixth embodiment. The variables and identifiers of tables 16, 17, and 18 are the same as those set forth above with respect to tables 1 through 3.

TABLE 16

| Lens surface (i) | Lens ((GjRk)) | Radius of curvature (R) | Thickness (D) | Refractive index (Nd) | Abbe's number (Vd) |
|---|---|---|---|---|---|
| 1 | G1R1 | 341.81496 | 1.400 | 1.84666 | 23.78 |
| 2 | G1R2/G2R1 | 50.54268 | 6.500 | 1.45650 | 90.27 |
| 3 | G2R2 | −221.50088 | 0.200 | | |
| 4 | G3R1 | 60.89819 | 4.362 | 1.73400 | 51.05 |
| 5 | G3R2 | −926.25733 | 0.200 | | |
| 6 | G4R1 | 30.81335 | 3.830 | 1.77250 | 49.62 |
| 7 | G4R2 | 71.93096 | D1 | | |
| 8 | G5R1 | 60.17265 | 0.800 | 1.88300 | 40.80 |
| 9 | G5R2 | 6.85760 | 3.872 | | |
| 10 | G6R1 | −17.96616 | 0.800 | 1.83481 | 42.72 |
| 11 | G6R2 | 95.07716 | 0.200 | | |
| 12 | G7R1 | 15.35510 | 4.404 | 1.84666 | 23.78 |
| 13 | G7R2/G8R1 | −25.21508 | 0.850 | 1.77250 | 49.62 |
| 14 | G8R2 | 32.98076 | D2 | | |
| 15 | Iris diaphragm | 1.00E+18 | 0.350 | | |
| 16 | G9R1 | 10.16590 | 6.500 | 1.69350 | 53.20 |
| 17 | G9R2 | −714.39840 | 1.273 | | |
| 18 | G10R1 | 18.24725 | 1.000 | 1.84666 | 23.78 |
| 19 | G10R2 | 8.13518 | D3 | | |
| 20 | G11R1 | 10.42112 | 5.000 | 1.48749 | 70.24 |
| 21 | G11R2/G12R1 | −8.99178 | 0.900 | 1.84666 | 23.78 |
| 22 | G12R2 | −14.33099 | D4 | | |
| 23 | Plane | 1.00E+18 | 2.880 | 1.51680 | 64.20 |
| 24 | Plane | 1.00E+18 | 2.430 | | |

TABLE 17

| | Wide angle end | Middle end | Telephoto end |
|---|---|---|---|
| Focal length | 4.65 | 20.39 | 115.00 |
| F number | 1.67 | 2.53 | 3.62 |
| D1 | 0.65 | 18.29 | 27.88 |
| D2 | 29.69 | 12.05 | 2.46 |
| D3 | 9.31 | 4.05 | 14.99 |
| D4 | 6.68 | 11.94 | 1.00 |

TABLE 18

| | Number of surfaces | | |
|---|---|---|---|
| | 16 | 17 | 20 |
| C | 0.098368104 | −0.001399779 | 0.095958933 |
| K | −0.409551138 | 0 | 0 |
| $A_4$ | −2.0062E−05 | 5.7064E−05 | −1.0418E−04 |
| $A_6$ | 8.2492E−08 | 0.0000E+00 | −2.9081E−07 |
| $A_8$ | −1.1343E−09 | 0.0000E+00 | 0.0000E+00 |
| $A_{10}$ | 0.0000E+00 | 0.0000E+00 | 0.0000E+00 |

Figure 23:
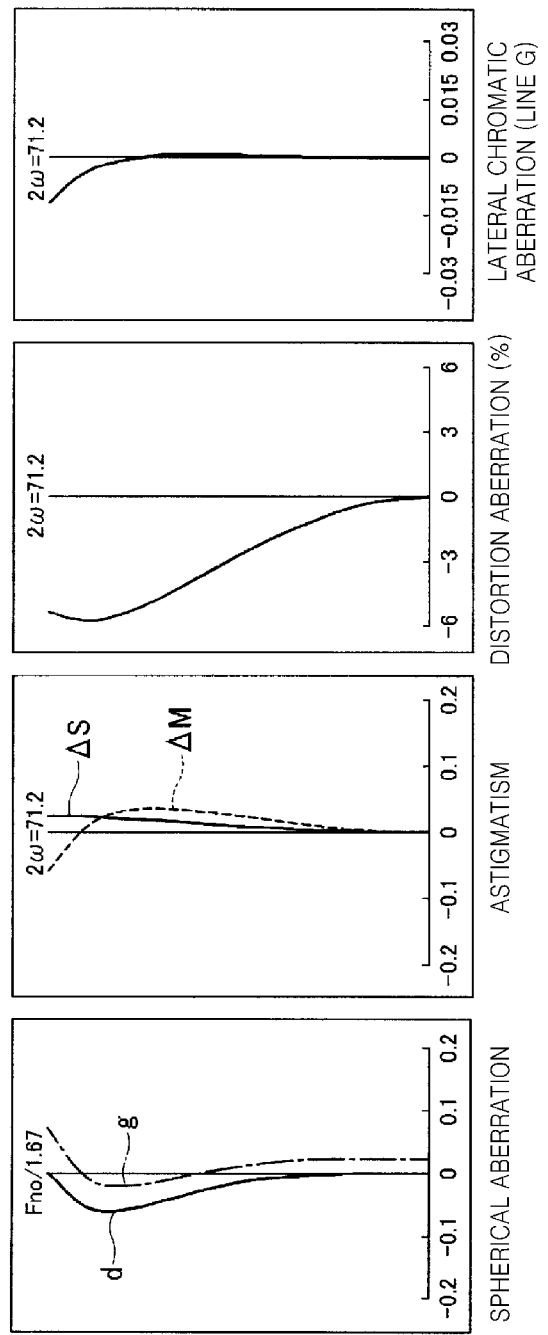
FIG. 23 are charts of aberration showing spherical aberration, astigmatism, distortion aberration, and lateral chromatic aberration at a wide angle end of the zoom lens of FIG. 22, respectively.
Figure 24:
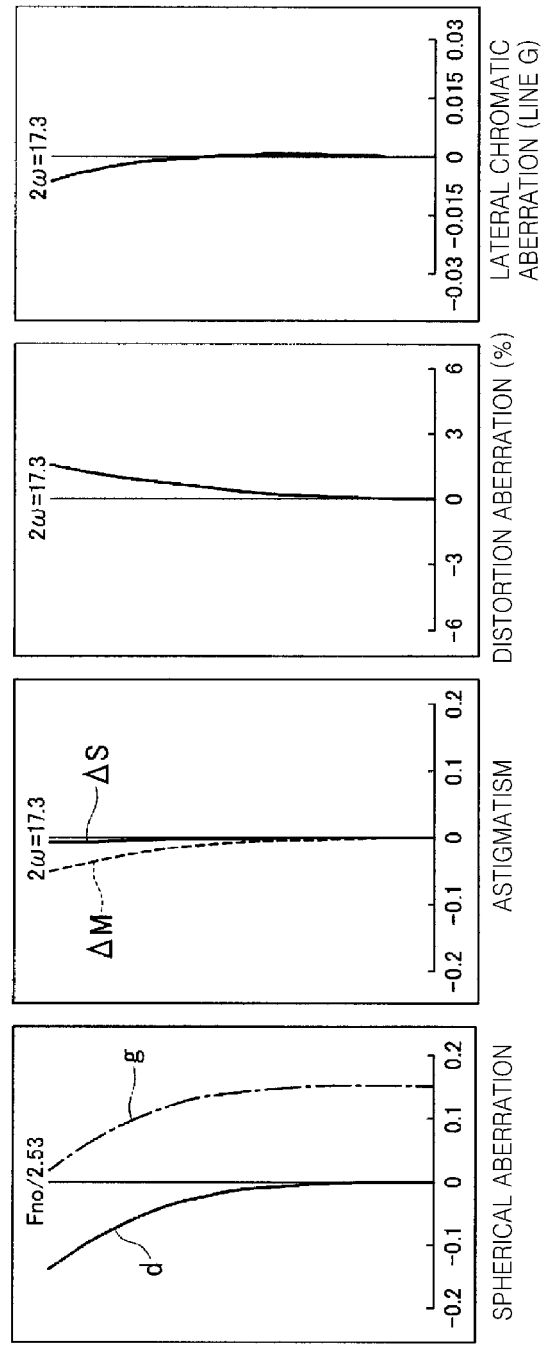
FIG. 24 are charts of aberration showing spherical aberration, astigmatism, distortion aberration, and lateral chromatic aberration at a middle end of the zoom lens of FIG. 22, respectively.
Figure 25:
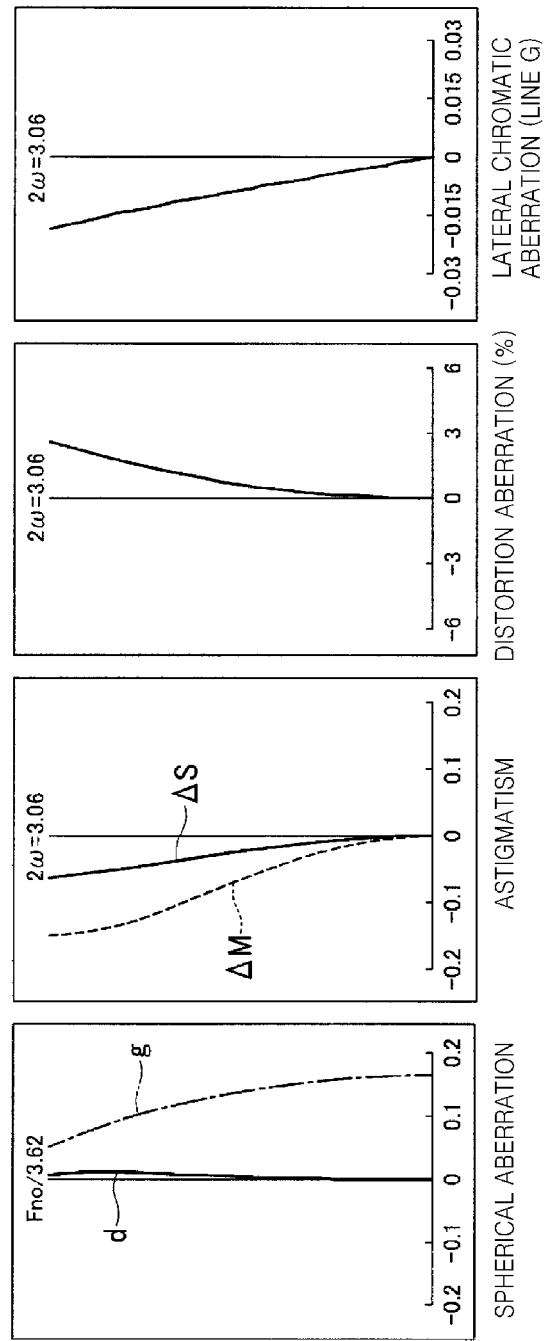
FIG. 25 are charts of aberration showing spherical aberration, astigmatism, distortion aberration, and lateral chromatic aberration at a telephoto end of the zoom lens of FIG. 22, respectively.

Spherical aberration, astigmatism, distortion aberration, and chromatic difference of magnification of the zoom lens having the above structure according to the sixth exemplary embodiment are shown in FIGS. 23, 24, and 25. The illustrative representations of FIGS. 23, 24, and 25 are similar to those of FIGS. 3 through 5. The zoom lens of the sixth exemplary embodiment has a zooming rate of about 24.7× and may properly correct each of the aforementioned aberrations, as illustrated in FIGS. 23, 24, and 25.

The following table shows that the first through sixth exemplary embodiments satisfy conditions of Equations 1 through 13.

TABLE 19

| Equation | First embodiment | Second embodiment | Third embodiment | Fourth embodiment | Fifth embodiment | Sixth embodiment |
|---|---|---|---|---|---|---|
| $|f2|/fw$ | 1.58 | 1.51 | 1.5 | 1.61 | 1.55 | 1.475 |
| $f1/fT$ | 0.48 | 0.452 | 0.443 | 0.493 | 0.515 | 0.347 |
| $\Sigma D/fT$ | 1.01 | 0.98 | 0.97 | 1.04 | 1.1 | 0.818 |
| $v1D$ | 81.6 | 81.6 | 81.6 | 81.6 | 81.6 | 90.27 |
| $R3W/R3T$ | 2.27 | 2.16 | 2.28 | 2.11 | 2.1 | 2.243 |
| $f3/fw$ | 5.16 | 5 | 5.04 | 4.94 | 4.91 | 5.811 |
| $\beta 4T$ | 0.46 | 0.46 | 0.44 | 0.51 | 0.41 | 0.503 |

As described above, through the above-described lens configuration, a zoom lens having a high zooming rate (for example, 15 times or more), a small-size, and a high optical performance, and a photographing apparatus including the zoom lens can be provided.

Figure 26:
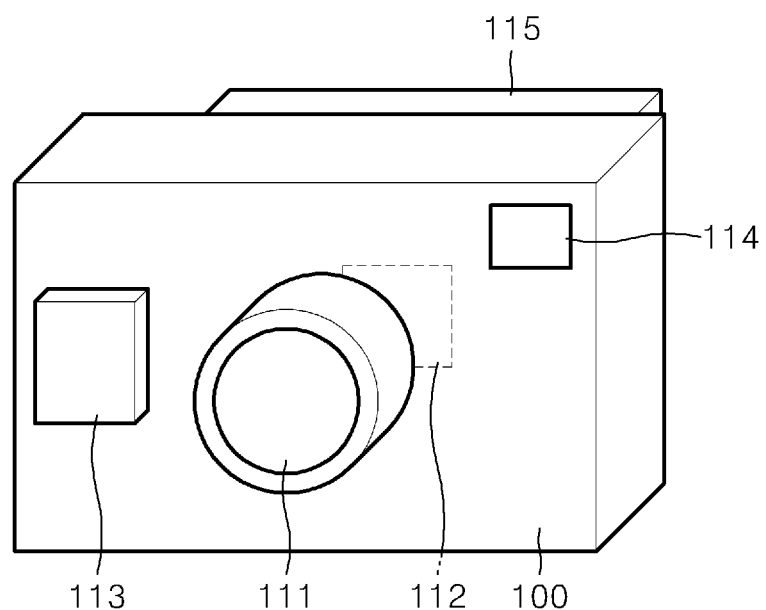
FIG. 26 is a schematic view of a photographing apparatus having a zoom lens, according to an exemplary embodiment.

FIG. 26 is a schematic view of a photographing apparatus 100 having a zoom lens 111, according to an exemplary embodiment. The photographing apparatus 100 includes the zoom lens 111, which may be one of the exemplary embodiments described above, and an imaging sensor 112 that converts light condensed by the zoom lens 111 into an electrical image signal. The photographing apparatus 100 may include a recording unit 113 in which information corresponding to an image of a subject that is photoelectrically converted by the imaging sensor 112 is recorded, and a view finder 114 that observes the image of the subject. A display unit 115 that may display the image of the subject may be provided. Although the view finder 114 and the display unit 115 are additionally provided, only an electronic finder in which a view finder and a display unit are used together without installing an additional view finder may be provided. The zoom lens 111 according to an exemplary embodiment may be employed in a single-lens reflex camera including a reflection mirror and an optical finder and a camera having an electronic finder.

The photographing apparatus of FIG. 26 is an example, and the present invention is not limited thereto and can be employed in various types of optical devices.

While exemplary embodiments have been particularly shown and described, it will be understood by those of ordinary skill in the art that various changes in form and details may be made therein without departing from the spirit and scope of the present invention as defined by the following claims.

What is claimed is:

1. A zoom lens comprising:
    a first lens group having a positive refractive power;
    a second lens group having a negative refractive power;
    a third lens group having a positive refractive power; and
    a fourth lens group having a positive refractive power,
    wherein the first lens group, the second lens group, the third lens group, and the fourth lens group are sequentially arranged from an object side to an image side,
    wherein zooming is performed by moving the second lens group in an optical axis direction and focusing is performed by moving the fourth lens group in the optical axis direction, and
    wherein the zoom lens satisfies the following Equations:

$1.4<|f_2|/f_W<2.0$, $0.3<f_1/f_T<0.6$, where a combined focal length of the first lens group is $f_1$, a combined focal length of the second lens group is $f_2$, a focal length of the zoom lens at a wide angle end is $f_w$, and a focal length of the zoom lens at a telephoto end is $f_T$.

2. The zoom lens of claim 1, wherein an iris diaphragm is disposed between the second lens group and the third lens group.

3. The zoom lens of claim 1, wherein the first lens group comprises a negative lens and three positive lenses sequentially arranged from the object side.

4. The zoom lens of claim 3, wherein the three positive lenses comprise two positive lenses each having a convex surface on the object side.

5. The zoom lens of claim 1, wherein the second lens group comprises at least three negative lenses and a positive lens sequentially arranged from the object side.

6. The zoom lens of claim 1, wherein the third lens group comprises a positive lens having a convex surface on the object side and a negative meniscus lens having a concave surface on the image side.

7. The zoom lens of claim 6, wherein, when a lens surface of the object side of the meniscus lens has a curvature radius of R3W and a lens surface of the image side of the meniscus lens has a curvature radius of R3T, the zoom lens satisfies a following Equation:

$1.5<R3W/R3T<3.0$.

8. The zoom lens of claim 1, wherein, when a length of an optical axis from a vertex of the object side of the lens disposed closest to the object side of the first lens group to an image plane is $\Sigma D$, the zoom lens satisfies a following Equation:

$0.6<(\Sigma D/fT)<1.3$.

9. The zoom lens of claim 1, wherein, when an Abbe's number of a positive lens disposed closest to the object side of the first lens group is v1D, the zoom lens satisfies the following Equation:

$80<v1D$.

10. The zoom lens of claim 1, wherein the fourth lens group comprises a positive lens having at least one aspherical surface and two convex surfaces and a negative meniscus lens having a concave surface on the object side.

11. The zoom lens of claim 1, wherein, when a focal length of the third lens group is $f_3$, the zoom lens satisfies the following Equation:

$4.0<f_3/f_W<6.0$.

12. The zoom lens of claim 1, wherein, when lateral magnification during focusing on an object at infinity e at the telephoto end is β4T, the fourth lens group satisfies a following Equation:

$0.3<\beta 4T<0.6$.

13. The zoom lens of claim 1, wherein the first lens group comprises a negative lens, a positive lens, and two positive lenses each having a convex surface on the object side, wherein the lenses are sequentially arranged from the object side to the image side, and the second lens group comprises at least three negative lenses and a positive lens, wherein the lenses are sequentially arranged from the object side to the image side, and the third lens group comprises a positive lens having a convex surface on the object side and a negative meniscus lens having a concave surface on the image side, wherein the lenses are sequentially arranged from the object side to the image side.

14. A photographing apparatus comprising:
a zoom lens; and
an imaging device for photoelectrically converting an image formed by the zoom lens,
wherein the zoom lens comprises:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image side,
wherein zooming is performed by moving the second lens group in an optical axis direction and focusing is performed by moving the fourth lens group in the optical axis direction, and
wherein the zoom lens satisfies the following Equations:

$$1.4 < |f_2|/f_W < 2.0,$$

$$0.3 < f_1/f_T < 0.6,$$

where a combined focal length of the first lens group is $f_1$, a combined focal length of the second lens group is $f_2$, a focal length of the zoom lens at a wide angle end is $f_W$, and a focal length of the zoom lens at a telephoto end is $f_T$.

15. The photographing apparatus of claim 14, wherein an iris diaphragm is disposed between the second lens group and the third lens group.

16. The photographing apparatus of claim 14, wherein the first lens group comprises a negative lens and three positive lenses sequentially arranged from the object side.

17. The photographing apparatus of claim 16, wherein the three positive lenses comprise two positive lenses each having a convex surface on the object side.

18. The photographing apparatus of claim 14, wherein the second lens group comprises at least three negative lenses and a positive lens sequentially arranged from the object side.

19. The photographing apparatus of claim 14, wherein the third lens group comprises a positive lens having a convex surface on the object side and a negative meniscus lens having a concave surface on the image side.

20. The photographing apparatus of claim 19, wherein, when a lens surface of the object side of the meniscus lens has a curvature radius of R3W and a lens surface of the image side of the meniscus lens has a curvature radius of R3T, the zoom lens satisfies the following Equation:

$$1.5 < R3W/R3T < 3.0.$$

21. The photographing apparatus of claim 14, wherein, when a length of an optical axis from a vertex of the object side of the lens disposed closest to the object side of the first lens group to an image plane is $\Sigma D$, the zoom lens satisfies the following Equation:

$$0.6 < (\Sigma D/f_T) < 1.3.$$

* * * * *